(12) United States Patent
Suh et al.

(10) Patent No.: US 8,035,914 B2
(45) Date of Patent: Oct. 11, 2011

(54) HARD DISK DRIVE AND METHOD FOR DESIGNING ADDITIONAL CONTROLLER INCLUDED IN HARD DISK DRIVE

(75) Inventors: Sang-min Suh, Seoul (KR); Kwang-jo Jung, Suwon-si (KR); Jeong-heon Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 339 days.

(21) Appl. No.: 12/364,664

(22) Filed: Feb. 3, 2009

(65) Prior Publication Data
US 2009/0195914 A1 Aug. 6, 2009

(30) Foreign Application Priority Data
Feb. 4, 2008 (KR) .................. 10-2008-0011088

(51) Int. Cl.
*G11B 5/596* (2006.01)

(52) U.S. Cl. .................................. 360/78.04

(58) Field of Classification Search ............... 360/78.04, 360/78.06, 78.09, 75, 78.05, 77.02
See application file for complete search history.

(56) References Cited

U.S. PATENT DOCUMENTS

| | | | | | |
|---|---|---|---|---|---|
| 5,680,272 | A | * | 10/1997 | Kadlec et al. | 360/78.04 |
| 5,825,582 | A | * | 10/1998 | Supino et al. | 360/78.06 |
| 5,847,895 | A | * | 12/1998 | Romano et al. | 360/78.09 |
| 7,315,433 | B2 | * | 1/2008 | Baek et al. | 360/78.09 |
| 7,548,396 | B2 | * | 6/2009 | Higashino | 360/78.05 |
| 7,706,099 | B2 | * | 4/2010 | Uchida et al. | 360/77.02 |

FOREIGN PATENT DOCUMENTS

| | | |
|---|---|---|
| JP | 2003109335 A | 4/2003 |
| JP | 2006139855 A | 6/2006 |
| KR | 1020010022682 A | 3/2001 |
| KR | 1020020000480 A | 1/2002 |

* cited by examiner

*Primary Examiner* — Fred Tzeng
(74) *Attorney, Agent, or Firm* — Volentine & Whitt, PLLC

(57) ABSTRACT

A hard disk drive is provided. The hard disk drive comprises a plant configured to drive the hard disk drive, a main controller configured to control the plant, and an additional controller connected in parallel with the main controller. A response function in consideration of the plant and the main controller is referred to as a main response function, and a response function in consideration of the plant and the additional controller is referred to as a first response function. The first response function cancels a function value corresponding to a section of the main response function that is associated with disturbance. The response function of the additional controller may be designed using the first response function. The hard disk drive removes a portion of the main response function to minimize the influence of the disturbance.

14 Claims, 8 Drawing Sheets

HARD DISK DRIVE AND METHOD FOR DESIGNING ADDITIONAL CONTROLLER INCLUDED IN HARD DISK DRIVE

CROSS-REFERENCE TO RELATED PATENT APPLICATION

This application claims the benefit of Korean Patent Application No. 10-2008-0011088, filed on Feb. 4, 2008, in the Korean Intellectual Property Office, the disclosure of which is incorporated herein in its entirety by reference.

BACKGROUND

1. Field of the Invention

The invention relates, generally, to a hard disk drive and, more particularly, but without limitation, to a hard disk drive and a method for designing an additional controller included in the hard disk drive.

2. Description of the Related Art

A hard disk drive includes a driver and a controller for controlling the driver. The driver includes a head, a slider, a head stack assembly, an actuator arm having a voice coil and a voice coil motor that moves the head to a desired position on a disk. The slider generates an air bearing between the head and the disk. The head stack assembly is combined with the slider and moves the slider. The head senses an electric field formed on the surface of the disk or magnetizes the surface of the disk to read/write information from/onto the disk. The actuator arm traverses the surface of the disk to support and reposition the head. The driver (sometimes called an actuator) is also referred to herein as a plant.

The controller controls the plant to accurately track a desired position of a data track on the disk. Specifically, the controller receives a position error signal (PES) output from the plant and outputs a control signal for compensating a position error generated when the head tracks the data track.

Figure 1A:
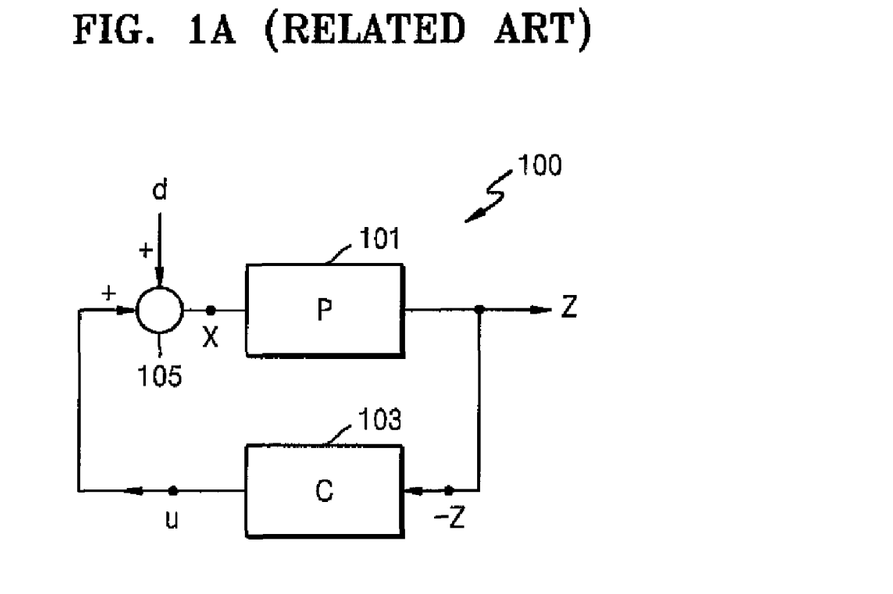
FIG. 1A is a block diagram of a conventional hard disk drive.

FIG. 1A illustrates a conventional hard disk drive 100. Referring to FIG. 1A, the conventional hard disk drive 100 includes a plant 101 for moving a magnetic head to a desired position on a disk and a controller 103 for controlling the plant 101 to be located on a target position of the disk. A signal Z output from the plant 101 may be a PES. Disturbance d is continuously applied to the hard disk drive 100 while the hard disk drive 100 operates. An adder 105 adds the disturbance d to controller output signal u, and applies the resulting sum X to the plant 101.

The disturbance is a component that obstructs the movement of the magnetic head to the target position of the disk. Furthermore, the disturbance d is a signal having an irregular generation time and an irregular magnitude. The disturbance may be associated, for example, with air turbulence caused by high-speed revolution of the disk, shaking of wires (that carry various signals between the controller and the plant) due to the turbulence, and/or variations in the environment (such as temperature).

Known hard disk drives do not adequately minimize the affect of such disturbances, however. Improved hard disk drives and control methods are therefore needed.

SUMMARY

Embodiments of the invention provide a hard disk drive capable of minimizing the influence of disturbance to stably control a plant. Embodiments of the invention also provide a method for designing an additional controller.

According to an aspect of the present invention, there is provided a hard disk drive. The hard disk drive includes: a plant configured to drive the hard disk drive; a main controller coupled in parallel with the plant and configured to control the plant; and an additional controller coupled in parallel with the main controller, wherein a response function in consideration of the plant and the main controller is referred to as a main response function, a response function in consideration of the plant and the additional controller is referred to as a first response function, and the first response function cancels a function value corresponding to a portion of the main response function.

According to an aspect of the present invention, there is provided a method for designing an additional controller for a hard disk drive. The method includes: obtaining a main response function corresponding to the response function of the hard disk drive having the plant and the main controller; obtaining a first response function that cancels a function value corresponding to a section of the main response function that amplifies a disturbance signal; and designing the additional controller using the first response function.

According to an aspect of the present invention, there is provided a hard disk drive. The hard disk drive includes: an actuator configured to position a head of the hard disk drive; a first controller coupled in parallel with the actuator; and a second controller coupled in parallel with the first controller, the first controller and the second controller coupled to receive an output signal from the actuator, the first controller and the second controller configured to control the actuator, the second controller configured to compensate for an undesirable component of an output of the first controller.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Throughout the drawings, like reference numerals refer to like elements.

Figure 1B:
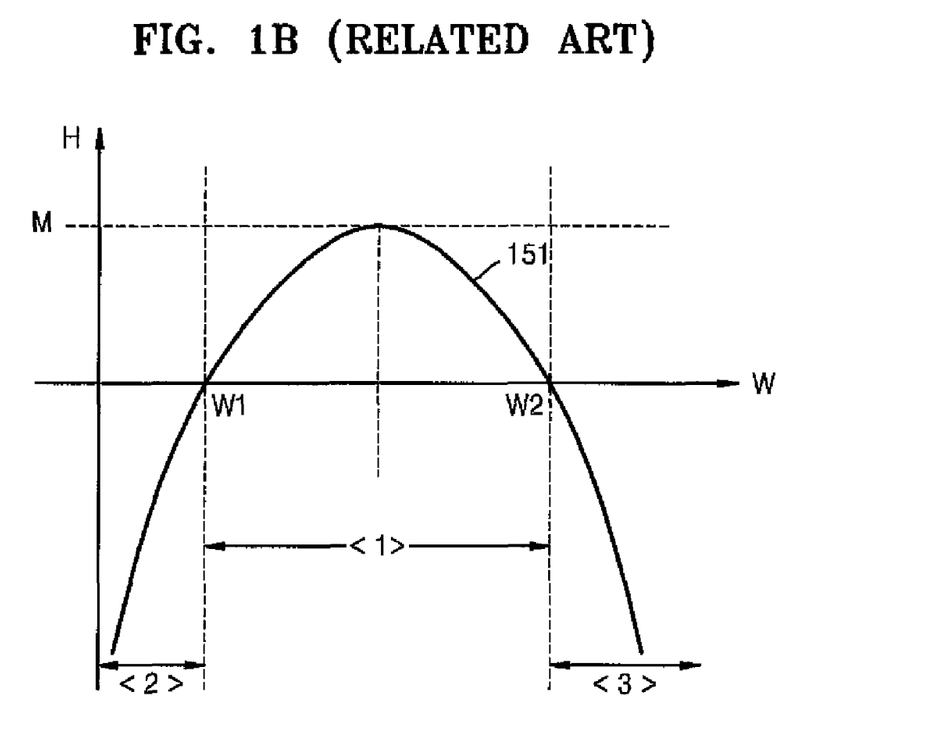
FIG. 1B is a graph illustrating a response function in the hard disk drive illustrated in FIG. 1A.

FIG. 1B is a graph illustrating a response function in the hard disk drive 100 illustrated in FIG. 1A. In FIG. 1B, a curve 151 represents the response function of the hard disk drive 100 with the controller 103 illustrated in FIG. 1A. The response function represents a ratio of an output signal to an input signal of a specific device. In the hard disk drive 100 illustrated in FIG. 1A, the response function may be defined in consideration of only an input signal received from an external device and a final output signal. Here, the input signal corresponds to the disturbance signal d and the output signal corresponds to the signal z illustrated in FIG. 1A. Accordingly, the response function of the hard disk drive 100 illustrated in FIG. 1A is z/d.

Referring to FIG. 1B, the response function of the plant 101 and controller 103 illustrated in FIG. 1A has a parabolic form. The X axis represents a variation in an angular frequency $\omega=2\pi f$ in terms of Hz, and the Y axis represents the magnitude H of the response function in terms of dB. The response function has cutoff frequencies W1 and W2 that correspond to zero of the response function (a value that makes the numerator of the response function zero). The peak of the magnitude H of the response function is represented by M.

If H=z/d, then z=H×d. That is, the product of the magnitude H of the response function by the disturbance d becomes the output z. Accordingly, a section <1> in which the magnitude H of the response function is greater than 0 dB amplifies the disturbance. Furthermore, section <2> and <3> in which the magnitude H of the response function is lower than 0 dB reduce the disturbance. Based on this fact, the present invention proposes an additional controller capable of making the response function value of the section that amplifies the disturbance (a section between W1 and W2) 0 dB.

Figure 2A:
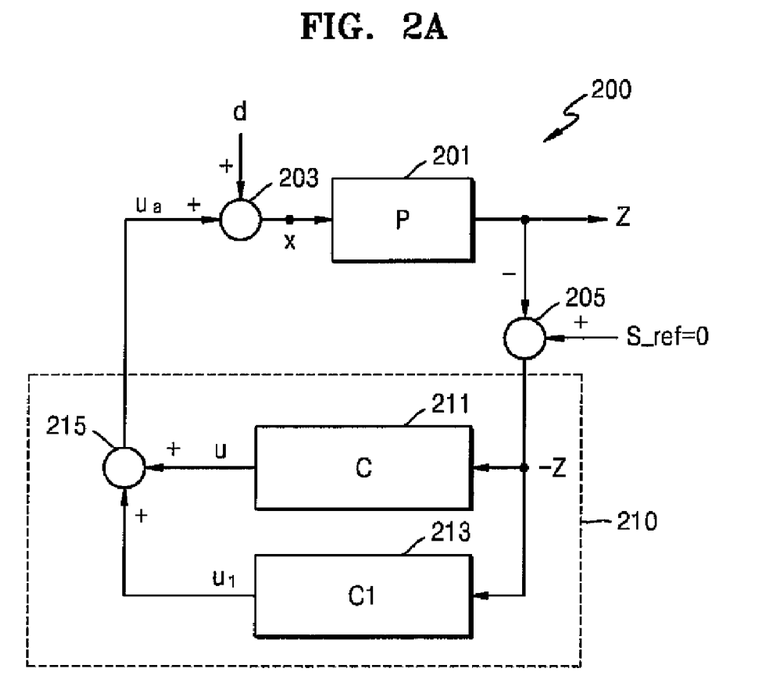
FIG. 2A is a block diagram of a hard disk drive according to an embodiment of the present invention.

FIG. 2A illustrates a hard disk drive 200 according to an embodiment of the present invention. Referring to FIG. 2A, the hard disk drive 200 includes a plant 201, a controller assembly 210, an adder 203 coupled to an input of the plant 201, and an adder 205 coupled to an output of the plant 201. The controller assembly 210 includes a main controller 211, an additional controller 213, and an adder 215.

The plant 201 drives the hard disk drive such that a head tracks a data track. The main controller 211 controls the plant 201 to be stably operated against disturbance d. The main controller 211 is coupled in parallel with the plant 201 and receives an input that is based on an output of the plant 201. The additional controller 213 is connected in parallel with the main controller 211. The adder 215 receives an output of the main controller 211 and also an output of the additional controller 213. The output of the adder 215 is coupled to an input of the adder 203.

A response function in consideration of only the plant 201 and the main controller 211 is referred to as a main response function S. In the conventional hard disk drive 100 including the plant 101 and the main controller 103 illustrated in FIG. 1A, the response function of the position error signal with respect to disturbance corresponds to the main response function S.

Furthermore, a response function in consideration of only the plant 201 and the additional controller 213 is referred to a first response function S1. That is, when the hard disk drive 200 includes only the plant 201 and the additional controller 213, the response function of the hard disk drive 200 with respect to the disturbance d corresponds to the first response function. The main response function and the first response function respectively correspond to an input/output function between the disturbance d and the position error signal output when the disturbance d is input.

The first response function S1 is designed to cancel a function value corresponding to a section that amplifies the disturbance d in the main response function S.

The adder 203 sums up the disturbance d and a controller output signal $u_a$, and outputs the summation result x to an input terminal of the plant 201. The adder 205 receives a reference signal S_ref and the output signal z (preferably, a position error signal) and subtracts the output signal z from the reference signal S_ref.

The reference signal S_ref is an offset value applied to the position error signal and it may be set by a user. When the reference signal S_ref is 0, the adder 205 outputs −z. The case where the reference signal S_ref is 0 is explained below.

The adder 215 sums signals output from the main controller 211 and the additional controller 213. The illustrated embodiment, the additional controller 213 removes the influence of disturbance d so as to improve the operating performance of the hard disk drive 200. The configuration and design of the additional controller 213 will be explained below.

Variations to the configuration illustrated in FIG. 2A are possible. For instance, in one embodiment, the controller assembly 210 includes the main controller 211 without the additional controller 213 and without the adder 215. In another embodiment, the controller assembly 210 includes the additional controller 213 without the main controller 211 and without the adder 215. Moreover, the adder 205 could be removed from any of the above-described embodiments, according to design choice.

Figure 2B:
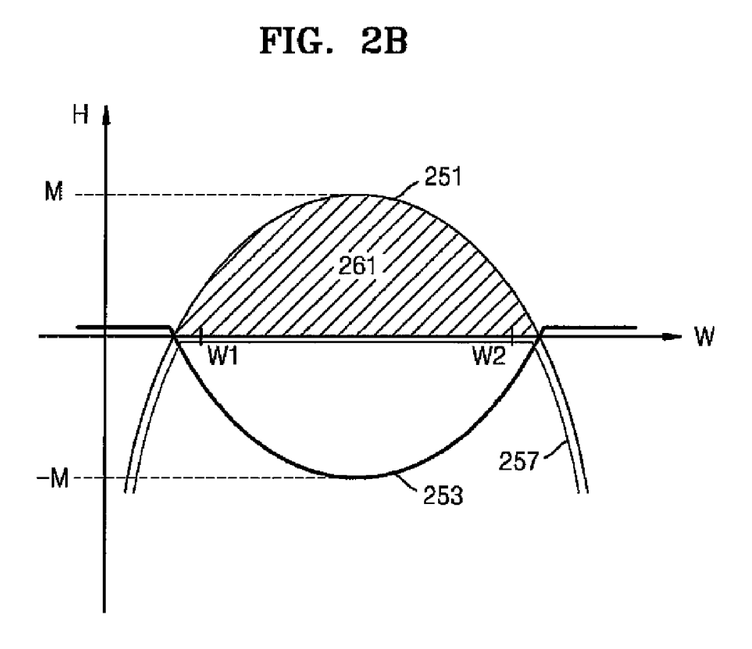
FIG. 2B is a graph illustrating a response function in the hard disk drive illustrated in FIG. 2A.

FIG. 2B is a graph illustrating a response function in the hard disk drive 200 illustrated in FIG. 2A. Referring to FIGS. 2A and 2B, a response signal of a position error signal with respect to the disturbance d is illustrated. In FIG. 2B, a curve 251 represents the main response function S when the hard disk drive 200 includes only the plant 201 and the main controller 211, a curve 253 represents the first response function S1 when the hard disk drive 200 includes only the plant 201 and the additional controller 213, and a curve 257 represents the response function of the hard disk drive 200 with controllers 211 and 213 (i.e., the embodiment illustrated in FIG. 2A).

The main response function S when the hard disk drive 200 includes only the plant 201 and the main controller 211 is obtained. The main response function S may be represented as follows.

$$z = P'x \qquad \text{[Equation 1]}$$
$$= P(d + (-z)'C)$$

The main response function (S=z/d) is obtained from Equation 1 as follows.

$$z + PCz = Pd \qquad \text{[Equation 2]}$$
$$z(1 + PC) = Pd$$
$$\frac{z}{d} = \frac{P}{1 + PC}$$

Here, z represents the output signal of the hard disk drive 200, preferably, a position error signal, and x represents the input signal of the plant 201. In addition, d denotes disturbance, P denotes the response function of the plant 201 (i.e., an input/output function of the plant 201), and C represents the response function of the main controller 211 (i.e., an input/output function of the main controller 211).

Subsequently, the response function Sa corresponding to a ratio of the position error signal to the disturbance d is obtained as follows.

$$Sa = \frac{P}{1 + P(C + C_1)}$$ [Equation 3]
$$= \frac{P}{(1 + P \cdot C)(1 + (1 + PC)^{-1} \cdot PC_1)}$$
$$= \frac{P}{1 + PC} \cdot \frac{1}{1 + P_1 C_1}$$
$$= S \cdot S_1$$

Here, $C_1$ denotes the response function of the additional controller 213, that is, an input/output function of the additional controller 213. The term P/(1+PC) in Equation 3 corresponds to the main response function S obtained according to Equation 2, and thus the first response function $S_1$ according the additional controller 213 becomes $1/(1+P_1 C_1)$ in Equation 3.

Referring to FIG. 2B, the main response function S is represented by the curve 251. The present invention designs the additional controller 213 capable of removing a section 261 of the main response function S, in which the magnitude H of the response function is greater than 0 dB. Accordingly, the first response function $S_1$ is represented by a curve 253 that is symmetrical with the main response function S between frequencies W1 and W2. That is, the response function $S_1$ of the additional controller 213 is designed such that the response function $S_1(=1/(1+P_1 C_1))$ becomes identical to the curve 253.

In section 261 of the graph illustrated in FIG. 2B, the magnitude H of the response function is greater than 0 dB. The disturbance d is multiplied by the magnitude H of the response function and output as the signal z. Accordingly, when the magnitude H of the main response function S becomes greater than 0 dB, the disturbance d increases and affects the overall hard disk drive. Therefore, the first response function $S_1$ is designed such that it has the curve 253 illustrated in FIG. 2B to cancel the function value corresponding to the section 261 of the main response function S, which amplifies the disturbance d.

As a result, the response function of the hard disk drive 200 including both the main controller 211 and the additional controller 213 with respect to the disturbance d is represented by the curve 257.

Preferably, the additional controller 213 is designed in a software manner. That is, when the response function of the additional controller 213 is obtained, the response function is implemented as software. The design of the additional controller 213 using the first response function $S_1$ will be described below.

Figure 3A:
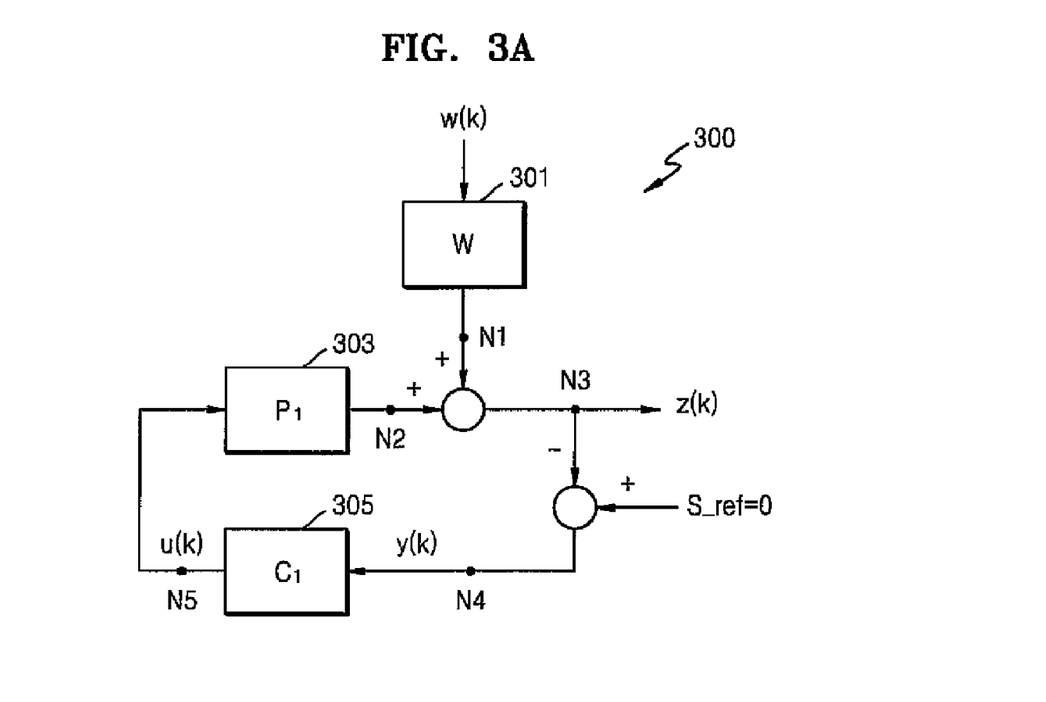
FIG. 3A is a block diagram of a hard disk drive virtually designed in order to design an additional controller illustrated in FIG. 2A.

FIG. 3A illustrates a hard disk drive 300 virtually designed in order to design the additional controller 213 illustrated in FIG. 2A. Referring to FIG. 3A, the hard disk drive 300 including a weighting function 301, a plant 303 and an additional controller 305 is virtually designed in order to obtain the response function $C_1$ of the additional controller 213 illustrated in FIG. 2A. Here, the plant 303 and the additional controller 305 are identical to the plant 201 and the additional controller 213 of the hard disk drive 200 illustrated in FIG. 2A.

The response function $C_1$ of the additional controller 305 may be obtained by virtually designing, and then using, the weighting function 301. Preferably, the response function $C_1$ is obtained by virtually designing the weighting function 301 connected to a node N2 (corresponding to an output terminal of the plant 303) and applying a value extracted from the output of the weighting function 301 and a value extracted from the output of the plant 303 to a linear matrix inequality (LMI) tool box.

Figure 3B:
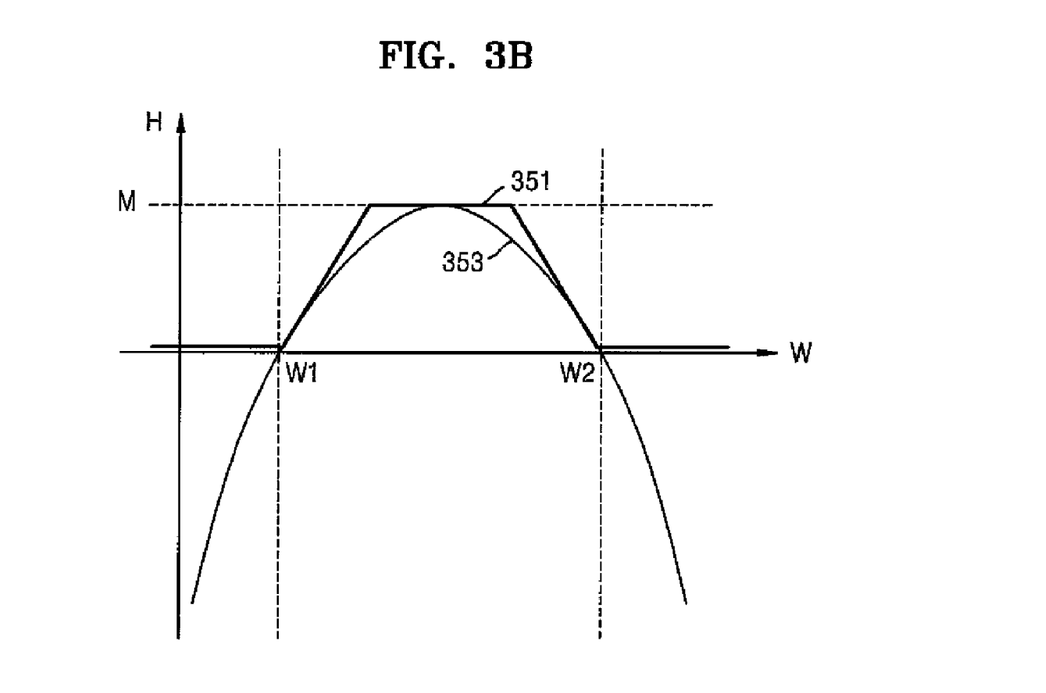
FIG. 3B is a graph illustrating the response function of a weighting function illustrated in FIG. 3A.

FIG. 3B is a graph illustrating the response function of the weighting function 301 illustrated in FIG. 3A. Referring to FIGS. 3A and 3B, the response function W(S) of the weighting function 301 is represented by a curve 351. A curve 353 represents the main response function S illustrated in FIG. 2A.

The response function W(S) of the weighing function 301 has a peak magnitude M, a low cutoff frequency W1, and high cutoff frequency W2, which are the same as for the main response function S. Preferably, the weighting function 301 does not exist in a region below the low cutoff frequency W1 and a region above the high cutoff frequency W2. Since the peak M, the low cutoff frequency W1 and the high cutoff frequency W2 can be known from the main response function S, the response function W(S) of the weighting function 301 may be obtained according to Equation 4.

$$W(S) = K \cdot \frac{s + \omega_1}{s + \omega_1 + M} \cdot \frac{\frac{s}{M} + \omega_2}{s + \omega_2}$$ [Equation 4]

Subsequently, the response function $C_1$ is obtained using the virtually designed weighting function 301 and an LMI technique. The LMI technique is a software program capable of calculating a desired function value through numerical analysis programming. The property and definition of LMI are well known in the art so that explanations thereof are omitted.

To use the LMI technique, equations must be extracted. These equations include an equation of state obtained by transforming the weighting function 301 into a discrete time domain, and an equation of state obtained by transforming the output of the plant 303 into the discrete time domain. Accordingly, when Equation 4 is transformed into an equation of state in the discrete time domain, Equation 5 is obtained.

$$W = (x_w(k+1), y_w(k))$$ [Equation 5]
$$W = \begin{matrix} x_w(k+1) = A_w x_w(k) + B_w w(k) \\ y_w(k) = C_w x_w(k) + D_w w(k) \end{matrix}$$

Here, $A_w$, $B_w$, $C_w$ and $D_w$ are values extracted from Equation 4, w(k) denotes a value assumed as the input signal of the weighting function 301, and $y_w(k)$ represents a signal applied to a first node N1 corresponding to an output terminal of the weighting function 301. When Equation 5 is transformed into a matrix, Equation 6 is obtained.

$$W = \begin{bmatrix} x_w(k+1) \\ y_w(k) \end{bmatrix} = \begin{bmatrix} A_w & B_w \\ C_w & D_w \end{bmatrix} \begin{bmatrix} x_w(k) \\ w(k) \end{bmatrix}$$ [Equation 6]

The response function $P_1$ of the plant 303 may be represented as follows in a discrete time state space.

$$P_1 = \begin{bmatrix} x_{p1}(k+1) \\ y_{p1}(k) \end{bmatrix} = \begin{bmatrix} A_{p1} & B_{p1} \\ C_{p1} & D_{p1} \end{bmatrix} \begin{bmatrix} x_{p1}(k) \\ u(k) \end{bmatrix} \quad \text{[Equation 7]}$$

Here, $A_p$, $B_p$, $C_p$ and $D_p$ are values extracted from the response function $P_1$ of the plant 301, u(k) denotes a signal input to the plant 303, and $y_{p1}(k)$ represents a signal applied to the second node N2, that is, the output terminal of the plant 303.

The output of the hard disk drive 300, z(k), corresponds to the sum of the output of the weighting function 301 and the output of the plant 303, and thus z(k) may be obtained from Equations 6 and 7.

To create a signal form capable of being input to LMI, the following values are generated from Equations 6 and 7.

$$x(k+1) = \begin{bmatrix} x_{p1}(k+1) \\ x_w(k+1) \end{bmatrix} \quad \text{[Equation 8]}$$

$$= \begin{bmatrix} A_{p1} & 0 \\ 0 & A_w \end{bmatrix} \begin{bmatrix} x_p(k) \\ x_w(k) \end{bmatrix} + \begin{bmatrix} 0 \\ B_w \end{bmatrix} \cdot w(k) +$$

$$\begin{bmatrix} B_{p1} \\ 0 \end{bmatrix} \cdot u(k)$$

$$Z(k) = y_{p1}(k) + y_w(k)$$

$$= C_{p1}x_{p1}(k) + C_w x_w(k) + D_w w(k) + D_{p1}u(k)$$

$$= [C_{p1} \; C_w] \begin{bmatrix} x_{p1}(k) \\ x_w(k) \end{bmatrix} + [D_w] \cdot w(k) + D_{p1}u(k)$$

$$y(k) = -Z(k)$$

$$= [-C_{p1} \; -C_w] \begin{bmatrix} x_{p1}(k) \\ x_w(k) \end{bmatrix} + [-D_w] \cdot w(k) + (-D_{p1}) \cdot u(k)$$

Coefficients of Equation 8 are represented as follows.

$$A = \begin{bmatrix} A_{p1} & 0 \\ 0 & A_w \end{bmatrix}, B_1 = \begin{bmatrix} 0 \\ B_w \end{bmatrix}, B_2 = \begin{bmatrix} B_{p1} \\ 0 \end{bmatrix} \quad \text{[Equation 9]}$$

$$C_1 = [C_{p1} \; C_w], D_{11} = D_w, D_{12} = D_{p1}$$

$$C_2 = -[C_{p1} \; C_w], D_{21} = -D_w, D_{22} = -D_{p1}$$

When A, $B_1$, $B_2$, $C_1$, $C_2$, $D_{11}$, $D_{12}$, $D_{21}$ and $D_{22}$ in Equation 9 are input to the LMI tool box, the response function $C_1$ of the additional controller may be obtained according to Equation 10. Equation 10 is an equation of state in the discrete time domain.

$$C_1 := x_{c1}(k+1) = A_{c1}x_{c1}(k) + B_{c1}y(k) \quad \text{[Equation 10]}$$

$$u(k) = C_{c1}x_{c1}(k) + D_{c1}y(k)$$

The response function $C_1$ of the additional controller may be specifically obtained according to Equation 11.

$$\begin{bmatrix} \mathcal{X} & I & \mathcal{A}\mathcal{X} + \mathcal{B}_2\mathcal{L} & \mathcal{A} + \mathcal{B}_2\mathcal{R}C_2 & \mathcal{B}_1 + \mathcal{B}_2\mathcal{R}\mathcal{D}_{21} & \Theta \\ I & \mathcal{Y} & \mathcal{Q} & \mathcal{Y}\mathcal{A} + \mathcal{F}C_2 & \mathcal{Y}\mathcal{B}_1 + \mathcal{F}\mathcal{D}_{21} & \Theta \\ \mathcal{X}\mathcal{A}^T + \mathcal{L}^T\mathcal{B}_2^T & \mathcal{Q}^T & \mathcal{X} & I & \Theta & \mathcal{X}^T C_1^T + \mathcal{L}^T\mathcal{D}_{12}^T \\ \mathcal{A}^T + C_2^T\mathcal{R}^T\mathcal{B}_2^T & \mathcal{A}^T\mathcal{Y} + C_2^T\mathcal{F}^T & I & \mathcal{Y} & \Theta & C_1^T + C_2^T\mathcal{R}^T\mathcal{D}_{12}^T \\ \mathcal{B}_1^T + \mathcal{D}_{21}^T\mathcal{R}^T\mathcal{B}_2^T & \mathcal{B}_1^T\mathcal{Y} + \mathcal{D}_{21}^T\mathcal{F}^T & \Theta & \Theta & I & \mathcal{D}_{11}^T + \mathcal{D}_{21}^T\mathcal{R}^T\mathcal{D}_{12}^T \\ \Theta & \Theta & C_1\mathcal{X} + \mathcal{D}_{12}\mathcal{L} & C_1 + \mathcal{D}_{12}\mathcal{R}C_2 & \mathcal{D}_{11} + \mathcal{D}_{12}\mathcal{R}\mathcal{D}_{21} & \gamma I \end{bmatrix} > \Theta \quad \text{[Equation 11]}$$

where $\mathcal{Q}, \mathcal{F}, \mathcal{L}, \mathcal{R}$, and symmetric matrices $\mathcal{X}, \mathcal{Y}$ are variables.

Value of $\gamma$ is minimized while satisfying Equation 11 to calculate Q, F, L, R, X, and Y. The $\gamma$ may be any scalar value greater than zero, and is set by a user. Also, $\Theta$ represents either zero or zero matrix.

Also, all variables included in Equation 11 are all defined in the LMI, and are well known to those in the art of designing controller by using the LMI technique.

Subsequently, the response function $C_1$ of the additional controller may be applied to Equation 12 to accomplish the design of the additional controller.

$$\mathcal{D}_K = \mathcal{R}, \quad \text{[Equation 12]}$$

$$C_K = (\mathcal{L} - \mathcal{R}C_2\mathcal{X})\mathcal{U}^{-1},$$

$$\mathcal{B}_K = \mathcal{V}^{-1}(\mathcal{F} - \mathcal{Y}B_2\mathcal{R},)$$

$$\mathcal{A}_K = \mathcal{V}^{-1}(Q - \mathcal{Y}(\mathcal{A} + \mathcal{B}_2\mathcal{R}C_2)\mathcal{X} - \mathcal{V}\mathcal{B}_K C_2\mathcal{X})\mathcal{U}^{-1} -$$

$$\mathcal{V}^{-1}\mathcal{Y}\mathcal{B}_2 C_K.$$

In other words, the additional controller is designed using response function of Equation 10 with coefficients in Equation 12.

The obtained response function $C_1$ of the additional controller is implanted as software to accomplish the design of the additional controller. A stable controller is designed using the response function $C_1$ according to characteristics of LMI. Accordingly, a stable controller can be designed any time by using the LMI technique without checking the stability of the controller.

Figure 4:
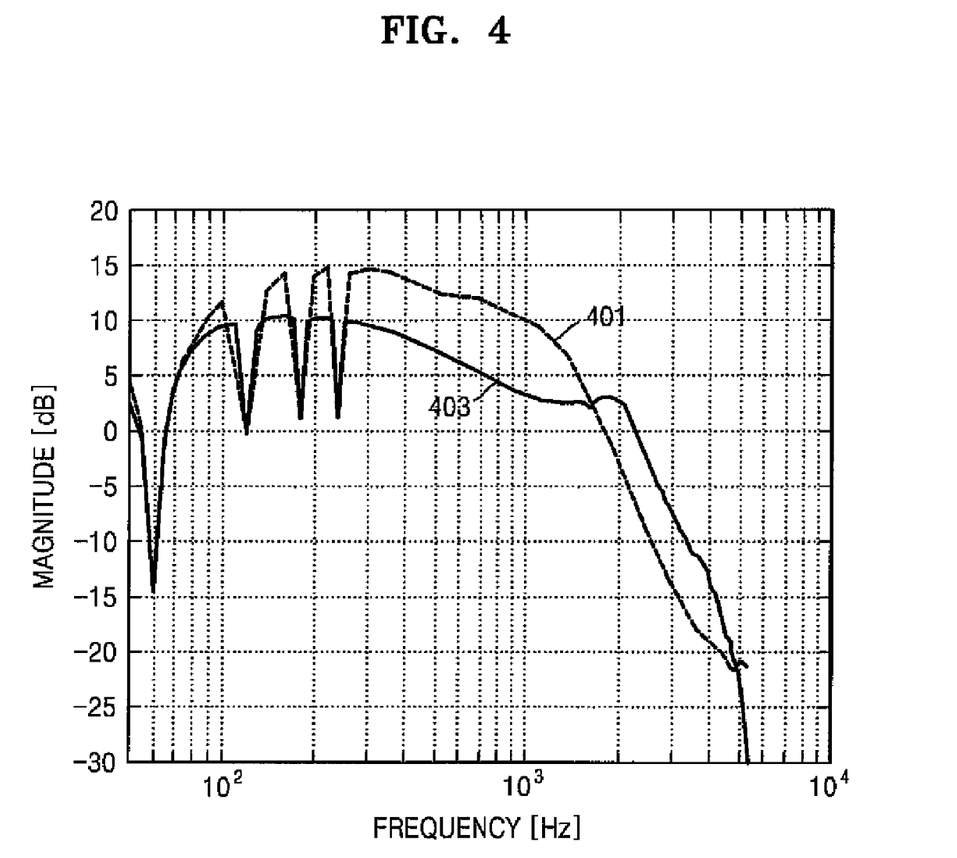
FIG. 4 is a graph illustrating a response function in the hard disk drive illustrated in FIG. 2A.

FIG. 4 is a graph illustrating the response function in the hard disk drive 200 illustrated in FIG. 2A. Referring to FIG. 4, a curve 403 represents a response function actually output from the hard disk drive 200 illustrated in FIG. 2A according to an embodiment of the present invention and a curve 401 represents the response function of the conventional hard disk drive 100 that does not include the additional controller, as illustrated in FIG. 1A. In FIG. 4, the X axis represents frequency in terms of Hz and the Y axis represents magnitude in terms of dB.

As illustrated in FIG. 4, the peak of the response function of the hard disk drive 200 illustrated in FIG. 2A according to an embodiment of the present invention is reduced by at least 5 dB below the peak of the response function of the conventional hard disk drive 100 illustrated in FIG. 1A. Accordingly, the hard disk drive 200 illustrated in FIG. 2A according to an embodiment of the invention can minimize the influence of disturbance on the plant.

Figure 5A:
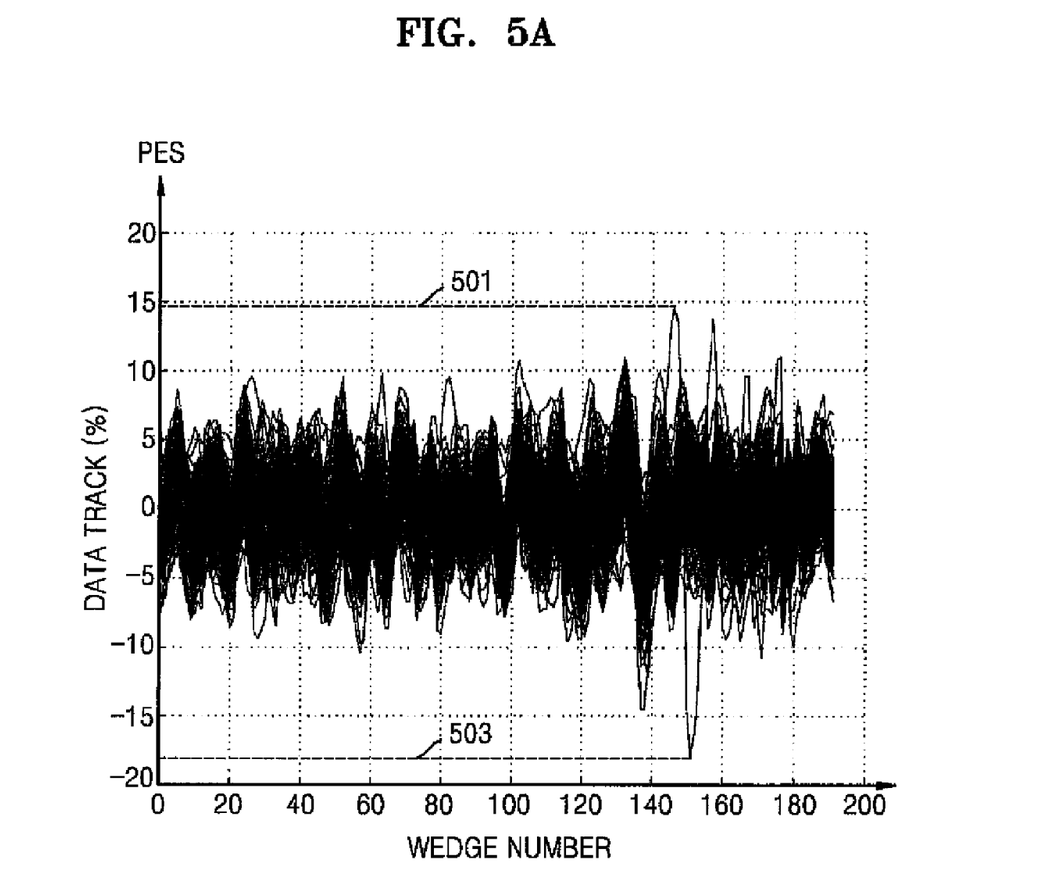
FIG. 5A is a graph illustrating a position error signal output from a conventional hard disk drive.

FIG. 5A is a graph illustrating a position error signal output from a conventional hard disk drive. In FIG. 5A, the X axis indicates a wedge number that represents a lapse of time, and the Y axis indicates a degree to which the position error signal vibrates. In the conventional hard disk drive, the degree to which the position error signal vibrates is in the range from +15% to −18% indicated by Y axis notations 501 and 503, respectively.

Figure 5B:
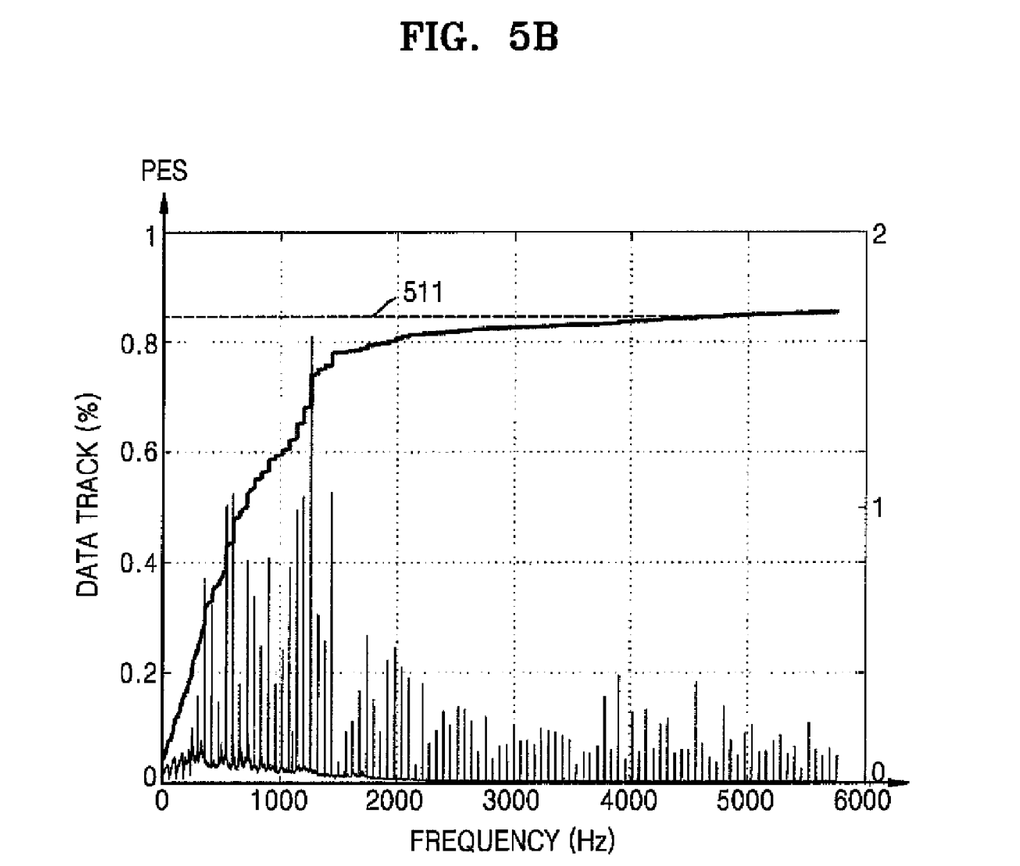
FIG. 5B illustrates a graph obtained by fast-Fourier-transforming the graph illustrated in FIG. 5A.

FIG. 5B illustrates a graph obtained by fast-Fourier-transforming the graph of FIG. 5A and is represented in a discrete time domain. Referring to FIG. 5B, the peak of the value obtained by fast-Fourier-transforming the position error signal corresponds to approximately 0.9% in a conventional hard disk drive, as indicated by Y axis notation 511.

Figure 6A:
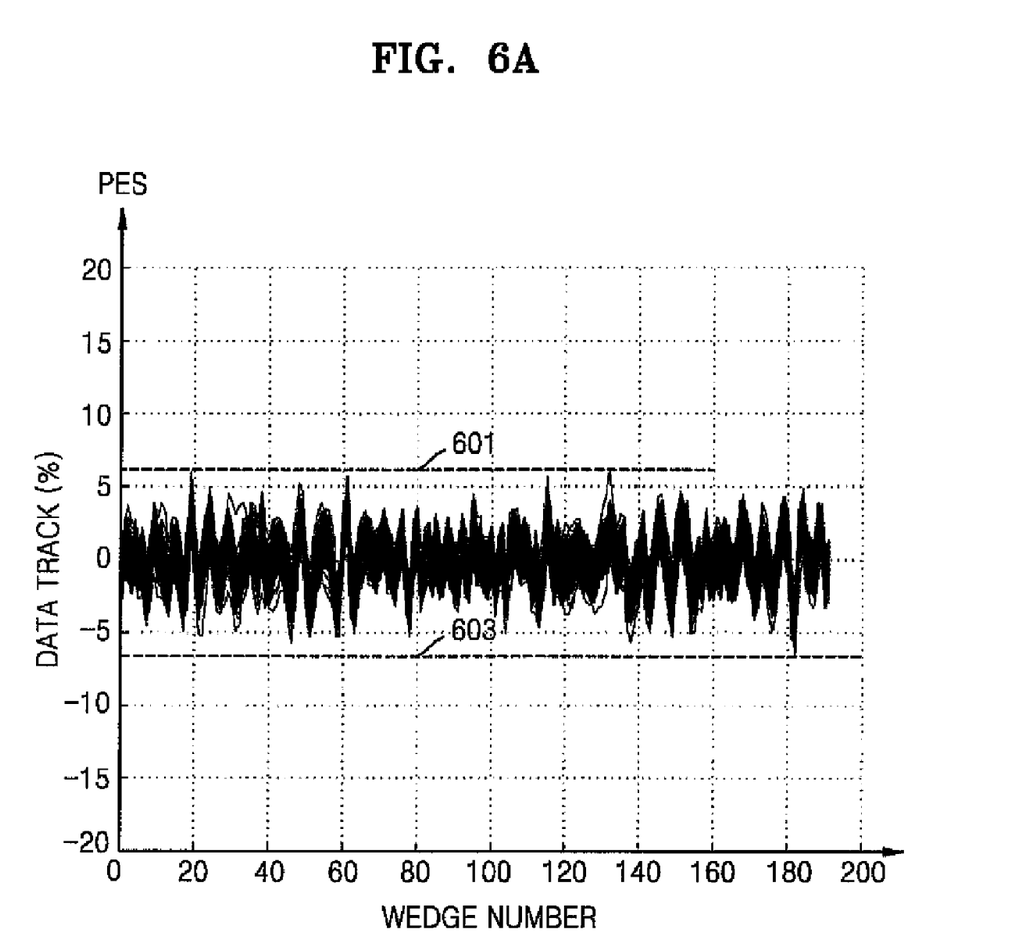
FIG. 6A is a graph illustrating a position error signal output from a hard disk drive according to an embodiment of the present invention.

FIG. 6A is a graph illustrating a position error signal output from a hard disk drive according to an embodiment of the present invention. Referring to FIG. 6A, in the hard disk drive according to an embodiment of the present invention, a degree to which the position error signal vibrates is in the range from 6% to −6%, as indicated by Y axis notations 601 and 603, respectively.

Comparing the graph of FIG. 6A to the graph of FIG. 5A, it can be seen that the degree to which the position error signal vibrates in the hard disk drive according to an embodiment of the present invention is considerably lower than that of the conventional hard disk drive. That is, the hard disk drive according to an embodiment of the present invention reduces the magnitude of the response function that corresponds to disturbance of the plant.

Figure 6B:
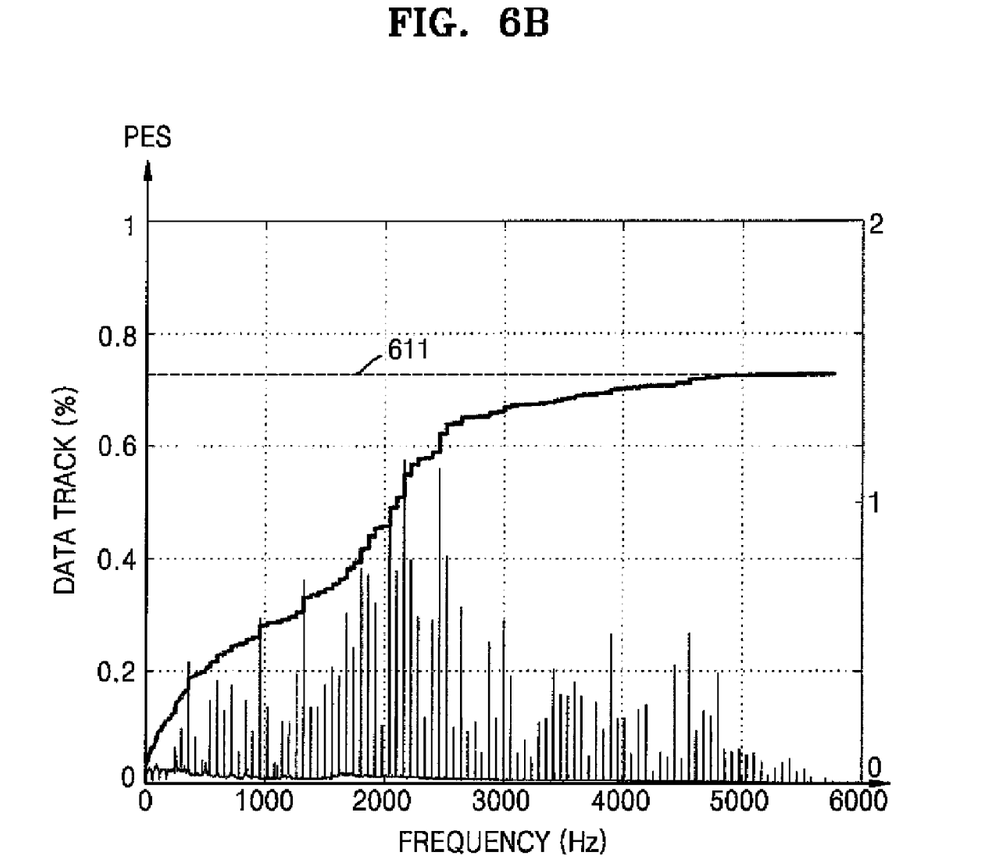
FIG. 6B illustrates a graph obtained by fast-Fourier-transforming the graph illustrated in FIG. 6A.

FIG. 6B illustrates a graph obtained by fast-Fourier-transforming the graph of FIG. 6A. Referring to FIG. 6B, the peak of the value obtained by fast-Fourier-transforming the position error signal corresponds to approximately 0.7% for a hard disk drive controlled according to an embodiment of the invention, as indicated by Y axis notation 611. The improvement over the conventional hard disk drive (FIG. 5B) is again apparent.

A method for designing the additional controller according to an embodiment of the present invention has the same technical spirit as the hard disk drive described above with reference to FIGS. 2A, 2B, 3A and 3B. Accordingly, those of ordinary skill in the art will understand the method for designing the addition controller according to an embodiment of the present invention from the above description so that detailed explanation thereof will be omitted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hard disk drive comprising:
 a plant configured to drive the hard disk drive;
 a main controller coupled in parallel with the plant and configured to control the plant; and
 an additional controller coupled in parallel with the main controller,
 wherein a response function of the hard disk drive, Sa, is given by:

$$Sa = \frac{P}{1 + P(C + C_1)}$$

where P is a response function of the plant, C is a response function of the main controller and $C_1$ is a response function of the additional controller, and
a response function of the plant and the main controller is a main response function, a response function of the plant and the additional controller is a first response function, and the first response function cancels a function value corresponding to a portion of the main response function.

2. The hard disk drive of claim 1, wherein each of the main response function and the first response function relate to a position error signal output from the plant and a disturbance signal input to the plant.

3. The hard disk drive of claim 1, the hard disk drive configured such that a curve associated with the first response function is substantially symmetrical about 0 dB to a curve associated with the main response function wherever a magnitude of the main response function is greater than 0 dB.

4. The hard disk drive of claim 1, the hard disk drive configured such that the response function of the hard disk drive, Sa, is given by:

$$Sa = \frac{P}{1 + P(C + C_1)}$$
$$= \frac{P}{1 + PC} \cdot \frac{1}{1 + P_1 C_1}$$
$$= S \cdot S_1$$

where S is the main response function and $S_1$ is the first response function, and the response function Sa corresponds to the product of the main response function S and the first response function $S_1$.

5. A method controlling operation of a hard disk drive in response to a disturbance signal, the hard disk drive comprising a plant having a response function P, a main controller having a response function C, the main controller coupled in parallel with the plant, and an additional controller having response function $C_1$ coupled in parallel with the main controller, the method comprising:
 obtaining a main response function S for the operative combination of the plant and the main controller;
 obtaining a first response function $S_1$ for the operative combination of the plant and an additional controller, such that the first response function cancels a function value corresponding to a section of the main response function that amplifies the disturbance signal, and a response function of the hard disk drive Sa is given by:

$$Sa = \frac{P}{1 + P(C + C_1)}$$
$$= \frac{P}{1 + PC} \cdot \frac{1}{1 + P_1 C_1}$$
$$= S \cdot S_1.$$

6. The method of claim 5, wherein the obtaining of the first response function $S_1$ comprises:

representing the main response function S in a main response curve of magnitude versus angular frequency; and obtaining the first response function $S_1$ such that a curve of magnitude versus angular frequency representing the first response function $S_1$ is symmetrical to a section of the main response curve, the section being associated with magnitudes of the main response curve that exceed 0 dB.

7. The method of claim 5, wherein obtaining of the first response function $S_1$ comprises:

selecting a weighting function connected to an output of the plant.

8. The method of claim 7, wherein the weighing function has a peak magnitude, a low cutoff frequency, and a high cutoff frequency substantially equal to those of the main response function S.

9. A hard disk drive, comprising:

an actuator configured to position a head of the hard disk drive in accordance with a response function P and in response to a disturbance signal;

a first controller coupled in parallel with the actuator and operating in accordance with a first response function C; and a second controller coupled in parallel with the first controller and operating in accordance with a second response function $C_1$, wherein the first controller and the second controller commonly receive an output signal from the actuator, and a response function of the hard disk drive Sa is given by:

$$Sa = \frac{P}{1+P(C+C_1)}$$
$$= \frac{P}{1+PC} \cdot \frac{1}{1+P_1 C_1}$$
$$= S \cdot S_1,$$

where S is a main response function for the operative combination of the plant and the first controller, and $S_1$ is a first response function for the operative combination of the plant and the second controller, such that the first response function cancels a function value corresponding to a section of the main response function that amplifies the disturbance signal to compensate for an undesirable component of an output of the first controller.

10. The hard disk drive of claim 9, wherein the output signal from the actuator is a position error signal.

11. The hard disk drive of claim 10, further comprising:

a first adder that receives an output of the first controller and an output of the second controller, a second adder that receives an output of the first adder and the disturbance signal to generate a control signal applied to the actuator.

12. The hard disk drive of claim 11, further comprising:

a third adder that receives the position error signal and a reference signal to generate an input signal commonly applied to the first and second controllers.

13. The hard disk drive of claim 12, wherein the reference signal is a user-defined offset value applied to the position error signal.

14. The hard disk drive of claim 9, wherein the undesirable component is associated with air turbulence between the head and a platter of the hard disk drive.

* * * * *